US006818572B2

(12) United States Patent
Puckhaber et al.

(10) Patent No.: US 6,818,572 B2
(45) **Date of Patent: *Nov. 16, 2004**

(54) FLOOR CLEANING WIPE

(75) Inventors: John Puckhaber, Brick, NJ (US); Harry Aszman, Englishtown, NJ (US)

(73) Assignee: Colgate-Palomolive Co, Piscataway, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 10/016,406

(22) Filed: Dec. 10, 2001

(65) Prior Publication Data

US 2003/0114060 A1 Jun. 19, 2003

(51) Int. Cl.$^{7}$ .............................. B32B 3/06; B32B 9/00; B32B 3/10; B32B 5/02; B32B 27/12

(52) U.S. Cl. ......................... 442/402; 428/195; 428/98; 428/103; 428/109; 428/137; 428/158; 442/96; 442/123; 442/128; 442/153; 442/169; 442/165

(58) Field of Search .......................... 428/195, 98, 103, 428/109, 137, 158; 442/327, 165, 170, 169, 96, 123, 153, 128

(56) References Cited

U.S. PATENT DOCUMENTS

| | | | | | |
|---|---|---|---|---|---|
| 4,600,620 | A | * | 7/1986 | Lloyd et al. | 428/195.1 |
| 5,380,452 | A | * | 1/1995 | Blanvalet et al. | 510/109 |
| 5,914,177 | A | * | 6/1999 | Smith et al. | 428/195.1 |
| 6,436,887 | B1 | * | 8/2002 | Puckhaber et al. | 510/214 |
| 6,495,499 | B1 | * | 12/2002 | Puckhaber et al. | 510/214 |
| 2001/0055609 | A1 | * | 12/2001 | Shantz et al. | 424/443 |

* cited by examiner

*Primary Examiner*—Terrel Morris
*Assistant Examiner*—Lynda M Salvatore
(74) *Attorney, Agent, or Firm*—Richard E. Nanfeldt

(57) ABSTRACT

A floor cleaning wipe comprising a water insoluble substrate which is impregnated with a floor cleaning composition.

7 Claims, No Drawings

FLOOR CLEANING WIPE

FIELD OF THE INVENTION

The present invention relates to a floor cleaning wipe which comprises a water insoluble substrate which has been impregnated with a liquid floor cleaning composition.

BACKGROUND OF THE INVENTION

The patent literature describes numerous wipes for both body cleaning and cleaning of hard surfaces but none describe the instant cleaning wipes which have improved cleaning characteristics in the minimization of streaking and residue, together with optimum mileage.

U.S. Pat. Nos. 5,756,612; 5,763,332; 5,908,707; 5,914,177; 5,980,922 and 6,168,852 teach cleaning compositions which are inverse emulsions.

U.S. Pat. Nos. 6,183,315 and 6,183,763 teach cleaning compositions containing a proton donating agent and having an acidic pH.

U.S. Pat. Nos. 5,863,663; 5,952,043; 6,063,746 and 6,121,165 teaches cleaning compositions which are water emulsions.

SUMMARY OF THE INVENTION

A floor cleaning wipe for cleaning floors comprises a water insoluble substrate consisting of two layers which is impregnated with a liquid cleaning composition containing tall oil soap, a sultaine surfactant, an amine oxide, a perfume, a preservative and water, wherein the liquid cleaning composition is not an emulsion and does not contain a sulfate or sulfonate surfactant, proteins, metallic salts, enzymes, amides, sodium hypochlorite, dimethicone, N-methyl-2-pyrrolidone, monoalkyl phosphate or silicon based sulfosuccinate.

DETAILED DESCRIPTION OF THE INVENTION

The present invention relates to a floor cleaning wipe for hard surfaces which comprises approximately:

(a) 5 wt. % to 20 wt. % of a water insoluble substrate formed from two layers; and (b) 80 wt. % to 95 wt. % of a liquid floor cleaning composition being impregnated in said water insoluble substrate, wherein said liquid cleaning composition comprises:

(i) 0.05 wt. % to 0.5 wt. %, more preferably 0.075 wt. % to 0.25 wt. % of at least one alkali metal salt of a long chain unsaturated fatty acid having about 8 to about 24 carbon atoms such as a refined tall oil fatty acid;

(ii) 0.001% to 0.01% of a sultaine surfactant;

(iii) 0.001% to 0.01% of an amine oxide surfactant;

(iv) 0 wt. % to 0.7 wt. %, more preferably 0.01 wt. % to 0.05 wt. % of a preservative;

(v) 0.01 to 0.5 wt. % of a perfume;

(vi) 0 to 0.4 wt. %, more preferably 0.01 to 0.2 wt. % of a metal chelant; and (vii) the balance being water, wherein the composition has a pH of about 9 to about 11, more preferably about 9.4 to about 10.6.

As used herein and in the appended claims the term "perfume" is used in its ordinary sense to refer to and include any non-water soluble fragrant substance or mixture of substances including natural (i.e., obtained by extraction of flower, herb, blossom or plant), artificial (i.e., mixture of natural oils or oil constituents) and synthetically produced substance) odoriferous substances. Typically, perfumes are complex mixtures of blends of various organic compounds such as alcohols, aldehydes, ethers, aromatic compounds and varying amounts of essential oils (e.g., terpenes) such as from 0% to 80%, usually from 10% to 70% by weight, the essential oils themselves being volatile odoriferous compounds and also serving to dissolve the other components of the perfume.

In the present invention the precise composition of the perfume is of no particular consequence to cleaning performance so long as it meets the criteria of having a pleasing odor. Naturally, of course, especially for cleaning compositions intended for use in the home, the perfume, as well as all other ingredients, should be cosmetically acceptable, i.e., non-toxic, hypoallergenic, etc. The instant compositions show a marked improvement in ecotoxocity as compared to existing commercial products.

The preferred long chain unsaturated fatty acids of the instant invention have about 8 to about 24 carbon atoms, more preferably about 10 to about 20 carbon atoms. A preferred unsaturated fatty acid mixture is a refined tall oil fatty acid. A typical tall oil fatty acid contains mono unsaturated $C_{16-18}$ fatty acid; a $C_{18}$ diene unsaturated fatty acid; a $C_{16-18}$ triene unsaturated fatty acid; and a $C_{16-18}$ saturated fatty acid. Other unsaturated fatty acids that are usable in the instant compositions are unsaturated vegetable oil fatty acids, including soy, peanut, corn, cottonseed, linseed and refined oleic fatty acids, and fatty acids consisting predominantly of $C_{18}$ (average) unsaturated fatty acids and mixtures thereof. The unsaturated fatty acid reacts in situ with the alkali metal hydroxide to form the alkali metal salt of the unsaturated fatty acid.

The composition contains about 0.001 wt. % to about 0.01 wt. % of an amine oxide, more preferably about 0.003 wt. % to about 0.08 wt. %. The preferred amine oxide is cocoamido-propyldimethyl amine oxide. The amine oxide is depicted by the formula:

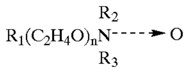

wherein $R_1$ is an alkyl, 2-hydroxyalkyl, 3-hydroxyalkyl, or 3-alkoxy-2-hydroxypropyl radical in which the alkyl and alkoxy, respectively, contain from about 8 to about 18 carbon atoms; $R_2$ and $R_3$ are each methyl, ethyl, propyl, isopropyl, 2-hydroxyethyl, 2-hydroxypropyl, or 3-hydroxypropyl; and n is from 0 to about 10. Particularly preferred are amine oxides of the formula:

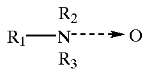

wherein $R_1$ is a $C_{12-18}$ alkyl and $R_2$ and $R_3$ are methyl or ethyl. The above ethylene oxide condensates, amides, and amine oxides are more fully described in U.S. Pat. No. 4,316,824 (Pancheri), incorporated herein by reference. An especially preferred amine oxide is depicted by the formula:

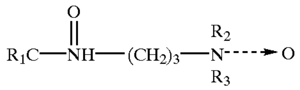

wherein $R_1$ is a saturated or unsaturated alkyl group having about 6 to about 24 carbon atoms, $R_2$ is a methyl group, and $R_3$ is a methyl or ethyl group. The preferred amine oxide is cocoamidopropyl-dimethylamine oxide.

The composition also contains about 0.001 wt. & to about 0.01 wt. %, more preferably about 0.003 wt. % to about 0.08 wt. % of a sultaine which is preferably a cocoamidopropylhydroxy sultaine. The sultaine can be depicted by the formula:

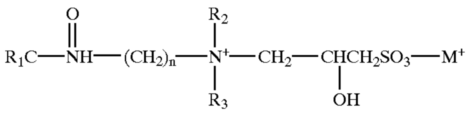

wherein $R_1$ is a saturated or unsaturated alkyl group having about 6 to about 24 carbon atoms, $R_2$ is a methyl or ethyl group, $R_3$ is a methyl or ethyl group, $M^+$ is about 1 to about 6, and $n^+$ is an alkali metal cation. The most preferred hydroxysultaine is a potassium salt of cocoamidopropyl hydroxysultaine.

The combination of the amine oxide and the sultaine functions to serve as a viscosity control agent while functioning as a means for the dispersion of lime soap.

The final essential ingredient in the instant composition is water. The proportion of water in the compositions generally is in the range of 98 wt. % to 99.8 wt. %.

The floor cleaning composition of this invention may, if desired, also contain other components either to provide additional effect or to make the product more attractive to the consumer. The following are mentioned by way of example: Colors or dyes in amounts up to 0.5%. The preservative is selected from the group consisting of formaldehyde, iodo propynyl butyl carbamate, 5-bromo-5-nitro-dioxan1,3; 5chloro-2-methylisothalizolin-3-one. Typical methyl chelating agents are ethylene diamine tetraacetate acid-sodium salt, hydroxy ethylene theylene diamine triacetic acid-trisodium salt and ethylene diamine disuccinate pH adjusting agents, such as sulfuric acid or sodium hydroxide, can be used as needed.

The cleaning compositions are prepared by simple batch mixing at 25° C.–30° C. The water insoluble substrate is impregnated with the liquid cleaning composition by means of a positive impregnation process. The liquid is positively fed into the water insoluble substrate through a controlled gear pump and injection bar at a ratio of about 6 to 9 grams of liquid cleaning composition to about 1 gram of the nonwoven fabric.

The water insoluble substrate can be square, rectangular, oval, circular or any other geometrically shape such that the water insoluble substrate can be readily attached to the head of a mop having a similar geometrical shape. The water insoluble substrate comprises two layers which are bonded together at least along the peripheral outer edges of the two layers, wherein the bonding can be any suitable means such as mechanical, ultrasonic or chemical means. One of the layers is a hydrophobic chemically bonded polyester nonwoven fabric and comprises 5 wt. % to 25 wt. % of the water insoluble substrate and the other layer is needle punched cellulose nonwoven fabric which comprises 75 wt. % to 95 wt. % of the water insoluble substrate.

Preferred water insoluble substrate is manufactured by the American Nonwoven Corporation and designated as 2380.

The following example illustrates a liquid cleaning composition of the described invention. The exemplified composition is illustrative only and does not limit the scope of the invention. Unless otherwise specified, the proportions in the examples and elsewhere in the specification are by weight.

EXAMPLE 1

The following floor cleaning wipes were made by the aforementioned process

| | A<br>Wt. % |
|---|---|
| Part I | |
| HEDTA | 0.104 |
| Tall oil fatty acid | 0.124 |
| KOH4 | 0.024 |
| Cocoamidopropylamine oxide | 0.005 |
| Cocoamidopropylhydroxy sultaine | 0.004 |
| Formaldehyde | 0.035 |
| Perfume | 0.034 |
| Water | Bal. |
| Part II | |
| Part I | 89.1 |
| American Nonwoven 2380-2 | 10.9 |

While particular embodiment of the invention and the best mode contemplated by the inventor for carrying out the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed:

1. A floor cleaning wipe which comprises approximately:

(a) 5 wt. % to 20 wt. % of a water insoluble substrate formed from two layers, one of said layers being a hydrophobic chemically bonded polyester nonwoven fabric which comprises 5% to 25% of the water insoluble substrate and the other layer is a needle punched cellulosic nonwoven fabric which comprises 75% to 95% of the water insoluble substrate; and (b) 80 wt. % to 95 wt. % of a liquid floor cleaning composition being impregnated in said water insoluble substrate, wherein said liquid cleaning composition comprises:

(i) 0.05 wt. % to 0.5 wt. % of an alkali metal salt of a long chain unsaturated fatty acid;

(ii) 0.001 wt. % to 0.01 wt. % of an amine oxide surfactant;

(iii) 0.001 wt. % to 0.1 wt. % of a sultaine surfactant;

(iv) 0.01 wt. % to 0.5 wt. % of a perfume;

(v) less than 0.5% of a preservative selected from the group consisting of formaldehyde, iodo propynyl butyl carbamate, 5-bromo-5-nitro-dioxan 1,3 and 5-chloro-2-methylisothalizolin-3-one; and (vi) the balance being water, wherein the composition is not an emulsion.

2. The floor cleaning wipe of claim 1, further including a metal chelant.

3. The wipe according to claim 1, wherein said amine oxide is characterized by the formula:

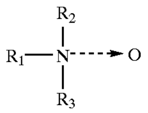

wherein $R_1$ is a $C_{12-16}$ alkyl and $R_2$ and $R_3$ are selected from the group consisting of methyl, ethyl, propyl, isopropyl, 2-hydroxethyl, 2-hydroxypropyl and 3-hydroxypropyl.

4. The wipe according to claim 1, wherein said amine oxide is cocoamido-propylamine oxide.

5. The wipe according to claim 3, wherein said sultaine is characterized by the formula:

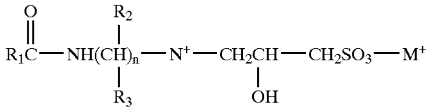

wherein n is about 1 to about 5, $M_{30}$ is an alkali metal cation, $R_2$ is a methyl or ethyl group, $R_3$ is a methyl or ethyl group, and $R_1$ is a saturated or unsaturated alkyl group having about 6 to about 24 carbon atoms.

6. The wipe according to claim 1, wherein said sultaine is cocoamido-propylhydroxy sultaine.

7. The composition according to claim 5, wherein said unsaturated fatty acid is a tall oil fatty acid.

* * * * *